US008898175B2

(12) United States Patent
Zenger et al.

(10) Patent No.: US 8,898,175 B2
(45) Date of Patent: *Nov. 25, 2014

(54) APPARATUS, SYSTEMS AND METHODS FOR DYNAMIC ON-DEMAND CONTEXT SENSITIVE CLUSTER ANALYSIS

(71) Applicant: Visier Solutions, Inc., Vancouver (CA)

(72) Inventors: Geoffrey Zenger, New Westminster (CA); Philipp Ziegler, Vancouver (CA)

(73) Assignee: Visier Solutions, Inc., Vancouver, British Columbia (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/255,589

(22) Filed: Apr. 17, 2014

(65) Prior Publication Data

US 2014/0236664 A1   Aug. 21, 2014

Related U.S. Application Data

(63) Continuation of application No. 13/584,810, filed on Aug. 13, 2012.

(51) Int. Cl.
*G06F 7/00* (2006.01)
*G06F 17/30* (2006.01)
*G06Q 10/06* (2012.01)

(52) U.S. Cl.
CPC .......... *G06Q 10/063* (2013.01); *G06Q 10/0633* (2013.01)
USPC ........................................................ 707/748

(58) Field of Classification Search
CPC ................ G06F 17/30; G06F 17/3053; G06F 17/30864; G06F 17/30867; G06Q 30/02
See application file for complete search history.

(56) References Cited

U.S. PATENT DOCUMENTS

| | | |
|---|---|---|
| 2008/0270363 A1 | 10/2008 | Hunt et al. |
| 2008/0288889 A1 | 11/2008 | Hunt et al. |
| 2008/0313008 A1 | 12/2008 | Lee et al. |
| 2008/0313596 A1 | 12/2008 | Kreamer et al. |
| 2009/0030771 A1 | 1/2009 | Eder |
| 2010/0274635 A1 | 10/2010 | Flinn et al. |
| 2011/0137924 A1 | 6/2011 | Hunt et al. |
| 2012/0162265 A1 | 6/2012 | Heinrich et al. |
| 2013/0091132 A1 | 4/2013 | Khalatov et al. |
| 2013/0091456 A1 | 4/2013 | Sherman et al. |
| 2013/0132435 A1 | 5/2013 | Yeung et al. |

*Primary Examiner* — Robert Beausoliel, Jr.
*Assistant Examiner* — Nicholas Allen
(74) *Attorney, Agent, or Firm* — Toler Law Group, PC (57) ABSTRACT

A particular method includes selecting a subset of a plurality of dimension members of a multi-dimensional data set. The method also includes computing a plurality of dimensional scores for the dimension members in the selected subset. Each dimensional score is associated with a particular dimension member in the subset and is a measure of a dimensional influence of the associated dimension member on a metric associated with the multi-dimensional data set. A dimension member with greater dimensional influence affects a value of the metric over a population more than a dimension member with less dimensional influence. The method further includes ranking the dimension members in the selected subset based on the dimensional scores.

19 Claims, 4 Drawing Sheets

APPARATUS, SYSTEMS AND METHODS FOR DYNAMIC ON-DEMAND CONTEXT SENSITIVE CLUSTER ANALYSIS

PRIORITY CLAIM

This application is a continuation patent application of, and claims priority from, U.S. patent application Ser. No. 13/584,810, filed on Aug. 13, 2012 and entitled "APPARATUS, SYSTEMS AND METHODS FOR DYNAMIC ON-DEMAND SENSITIVE CLUSTER ANALYSIS," which is hereby incorporated by reference in its entirety.

BACKGROUND

I. Field of the Invention

The present invention relates to the field of business intelligence and in particular, to apparatus, systems, and methods for facilitating dynamic on-demand context sensitive cluster analysis in business intelligence systems.

II. Description of Related Art

In modern organizations, strategic planning can be central to the evaluation of business risks and for efficient and optimal deployment of organizational resources including human resources. For example, strategic planning may involve determining current resource demands and utilization—including both human and material resources, forecasting future resource demands, and planning to satisfy current and estimated future resource demands in a cost optimal manner. Accordingly, many organizations use a variety of systems such as Enterprise Resource Planning ("ERP") systems, which facilitate automated organizational integration of management information. Typically, ERP systems take the form of a complex software suite facilitating the flow of information between various organizational entities such as sales, finance, accounting, manufacturing, human resources, etc.

Business Intelligence ("BI") systems can process data generated by ERP systems to calculate key performance indicators for various organizational entities and processes and drive decisions. For example, information in ERP systems may be aggregated by a BI system in a variety of ways to match the specific needs of departments. For example, the data aggregation may occur in one fashion for the sales department and in another manner for manufacturing. BI systems thus support planning, budgeting, forecasting and reporting, including, for example, the setting of targets for organizational entities and processes and the monitoring of progress toward those targets.

Traditional BI systems exhibit several drawbacks because of their inherent complexity. For example, the complexity of BI systems makes deployment and customization for specific applications difficult. In addition, BI systems are not easily adapted to deal with unstructured or semi-structured data or to changes in the format of the underlying data. Further, non-technical organizational staff may often experience difficulty in using BI systems. The lack of employee comfort or competence with BI systems can lead to problems in quickly generating intelligence for a specific department or application. Moreover, the large cost and support overheads associated with ERP and BI systems are an impediment to their wide use and deployment. Finally, while traditional ERP and BI systems may permit calculations of various metrics, these systems do not facilitate analysis of the impact of one or more populations on the calculated metrics. Therefore, organizations are often deprived of the competitive advantage of good business intelligence.

Thus, there is a need for apparatus, systems and methods that facilitate dynamic on-demand context sensitive cluster analysis in business intelligence systems in a cost and resource optimal manner.

SUMMARY

Consistent with embodiments disclosed herein, apparatus, systems and methods for facilitating dynamic on-demand context sensitive cluster analysis in business intelligence systems are presented. In some embodiments, a method for performing on-demand cluster analysis on a multi-dimensional data set comprising a plurality of dimension members comprises: selecting of a subset of the plurality of dimension members, wherein the selected subset of the plurality of dimension members is dynamically determined based on a current context associated with the multi dimensional data set; computing a plurality of dimensional scores for a plurality of dimension members in the selected subset, wherein each dimensional score is associated with a distinct dimension member and is a measure of a dimensional influence of the associated dimension member on a metric associated with the multi-dimensional data set; and ranking the plurality of dimension members in the selected subset based on the dimensional score. In some embodiments, the current context may be dynamically determined based on a portion of the multi dimensional data set determined to be relevant. In some embodiments, the methods may be performed on compute clouds, server farms, and/or various computing devices.

Embodiments also relate to software, firmware, and program instructions created, stored, accessed, or modified by computers and/or processors using computer-readable media or computer-readable memory. The methods described may be performed on various computing devices including distributed computing systems such as clouds.

These and other embodiments are further explained below with respect to the following figures.

DETAILED DESCRIPTION

Consistent with embodiments disclosed herein, apparatus, systems and methods for facilitating dynamic on-demand context sensitive cluster analysis in business intelligence systems are presented.

Figure 1:
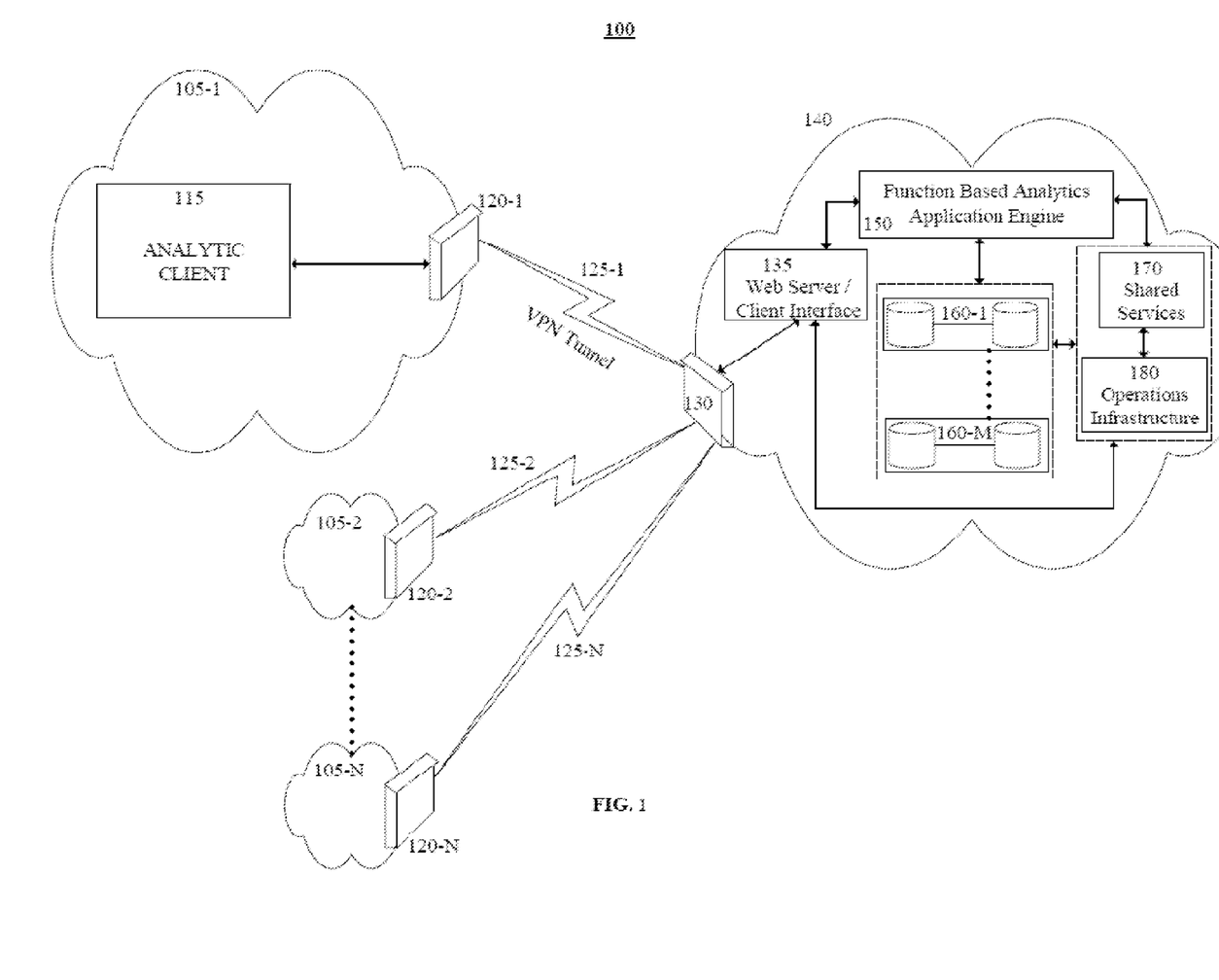
FIG. 1 shows a block diagram illustrating an exemplary system for facilitating dynamic on-demand context sensitive cluster analysis in business intelligence systems.

FIG. 1 shows a block diagram illustrating an exemplary system 100 for facilitating dynamic on-demand context sensitive cluster analysis in business intelligence systems.

As shown in FIG. 1, exemplary system 100 may include one or more customer or user locations 105, such as exemplary user locations 105-1, 105-2 . . . 105-N. In general, user locations 105 may comprise one or more networked computing devices. Computing devices may include some combination of one or more networked desktop computers, computer servers, and/or mobile computing devices such as laptops, tablets, handheld or wearable computing devices, and/or smartphones. Computing devices in user locations may have graphics and video capability and include one or more integrated or external displays, projection devices, modems, network controllers, and/or printing devices, as well as various other peripherals. Networking between computing devices in user locations 105 and/or Data Center(s) 140 may be implemented using high speed wired networks such as Gigabit Ethernet or wireless local area networks (WLANs), for example, using IEEE 802.11a/b/g/n standards.

In some embodiments, system 100 may use a client-server architecture, where one or more clients running on computing devices in user locations 105 interact with and access services provided by Data Center 140, which may include services to facilitate dynamic on-demand context sensitive cluster analysis for business intelligence in multi-dimensional databases. In some embodiments, these services may be executed on-demand in response to requests originating from a client. The term "context sensitive" refers to the use of a current context associated with the multi-dimensional database during analysis, query generation, and other business intelligence operations. The current context may be seen as specifying a cube view or a portion of the multi-dimensional database for the current fact population being analyzed. The term dynamic refers, in part, to the capability to automatically determine and keep track of changes to the current context and to perform real-time cluster analysis on-demand in a context sensitive manner.

For example, a user at user location 105-1 may use a browser running on a smartphone with a high-resolution display to access services provided by Data Center 140 using Virtual Private Network ("VPN") tunnel 125-1 over a wireless 3G or 4G cellular network. As another example, several users at a user location 105-2 may be logged in to a computer server and access services provided by Data Center 140 through VPN tunnel 125-2. In general, VPN tunnels 125 may be implemented over some combination of wired and/or wireless networks. Further, in the example above, the use may use a client, which may take the form of a web browser, to view data in a multi-dimensional database for a Human Capital Management ("HCM") application. For example, the use may browse data in the multi-dimensional HCM database to view employees by geography and the current context may be Location: North America. The user may move further down in the same geographical dimension to view data for employees by Country in Canada and the system may update the current context to "Country: Canada." If the user further views data for employees with Job Status "Full Time Employee" ("FTE")—the system may add a Job Status dimension member "Full Time Employee" to the current context—so that the current context may be given by (Location: North America, Country: Canada, Job Status: FTE). In the example above, Location and Country are members of a geographical dimension, while "Job Status" is a distinct dimension.

In some embodiments, if the user requests data regarding "Terminated Employees" using a query, then, the system may utilize the user's current context (Canada; FTE) to generate a query of the form "Terminated FTEs in Canada," which may be sent by the client servers in Data Center 140. In some embodiments, the query may be processed in real-time and the results may be returned to the client for display.

In some embodiments, services to facilitate dynamic on-demand context sensitive cluster analysis for business intelligence provided by Data Center 140 may be cloud-based. "Cloud computing" can refer to the use of a company's own computer cluster (a "private cloud"), but more often the term refers to the use of computing resources that are made available over the Internet, often through Web browser-based or client-side applications. In some embodiments, services to facilitate dynamic on-demand context sensitive cluster analysis for business intelligence provided by Data Center 140 may use virtualization and/or sophisticated systems management solutions to provide a flexible, fault tolerant, and highly available view of underlying resources so that hardware resources in Data Center 140 can be dynamically shared across several users instead of being assigned individually. These computing resources, which are often made available as virtual machines (and in some instances as physical machines), may be accessed using Application Programming Interfaces ("APIs") and/or portals, which may be websites accessed through a web browser.

In some embodiments, a user at one of user locations 105 may access cloud-based services through Analytic Client 115. In general, Analytic Client 115 may be some combination of hardware and software that facilitates access to cloud-based services providing dynamic on-demand context sensitive cluster analysis for business intelligence. For example, Analytic Client 115 may comprise a web browser running on a computing device and an application container, which may take the form of a web browser add-on, extension, and/or plug-in, may hold a variety of analytic application front-ends.

Predefined workflows may be used to couple one or more analytics applications front-ends hosted by the application container. Predefined workflows may comprise a collection of functions used for analysis of specific business problems. In some embodiments, where calculations and specific formulas are used by one or more of the workflows, some functions can be prebuilt. In some embodiments, the predefined workflows may be specified by customizable, declarative application configuration files that describe data, security policies, visualizations, workflows schema in both client and server at run-time. Further, in some embodiments, the predefined workflows may be context-sensitive and use functions that take in the current application data context.

For example, in a Human Capital Management ("HCM") domain, for a user browsing data pertaining to employees by geography, the current context may be North America. In the example above, a simple function to determine "Terminated Employees" may utilize the user's current context (North America) to generate a "vQuery" of the form "Terminated employees in North America." In general, a vQuery may be viewed as a set of processing function calls, associated metrics, and/or parameter values that define an execution path to be used by Function Based Analytics Application Engine 150 to generate a result set for Analytic Client 115. A processing function is any function called upon by Function Based Analytics Application Engine 150. In some embodiments, processing functions may include data transformation functions, data fetch functions, exporting functions, and other custom user-defined functions. As another example, in a Sales domain, with a user viewing quarterly sales data by geography and time period, the current context may be "Canada" and "Q1 2011." Accordingly, a request to determine "Annualized Turnover Rate for Products" may generate a vQuery of the form "Annualized Turnover Rate for Products in Canada in Q1 2011."

In general, a vQuery may comprise and/or depend on other nested functions, or further vQueries. If a parent vQuery depends on other child vQueries, then the child vQueries will be evaluated before the parent vQuery. Further, in some embodiments, a vQuery may return multi-dimensional cell sets, source records from a database or web service, and/or various other record sets. In some embodiments, Analytics Client 115 may communicate with servers in Data Center 140 using JavaScript Object Notation ("JSON"), which is a lightweight data-interchange format that is easy for humans to read and write and easy for machines to parse and generate. JSON is based on a subset of the JavaScript Programming Language, Standard ECMA-262 3rd Edition—December 1999. In some embodiments, Analytic Client 115 and servers at Data Center 140 may communicate using Representational State Transfer (REST) over secure Hypertext Transfer Protocol ("https") over VPN tunnel 125 and JSON wire format may be used by to serialize and exchange structured data.

REST is a style of software architecture, which may be used for distributed systems including clouds. In REST-style architectures, clients initiate requests to servers, which servers process returning appropriate responses. Requests and responses are built around the transfer of resource representations, which may take the form of a document that captures a current or expected state of a resource. In REST, client requests may include all of the information to service the client request, and any session state is maintained by the client.

VPN tunnels 125 enable communication through Firewalls 120 at user locations 105 and the Firewall(s) 130 at Data Center 140. Communication may occur through some combination of wired and wireless networks. In some embodiments, Data Center 140 may comprise multiple servers that serve users. In some embodiments, multiple Data Centers 140 (not shown) may be used to serve users. The use of multiple servers at a Data Center 140 and/or the use of multiple Data Centers 140 may improve system performance and scalability by enabling load-balancing, shared caching, and/or enforcing security policies.

In some embodiments, Data Centers 140 in system 100 that facilitate cloud-based on-demand context sensitive cluster analysis for business intelligence may support multiple customers, where each customer may have one or more users. For example, in FIG. 1, a provider of dynamic on-demand context sensitive cluster analysis services for business intelligence may use Data Center 140 to serve multiple customers, who may be geographically distributed at a plurality of user locations 105-1 through 105-N. In some embodiments, security and other policies at Data Center 140 may ensure the privacy, security, integrity, and availability of customer information stored in databases 160. Thus, organizations can significantly reduce the cost of infrastructure, overhead, maintenance, etc. associated with on-demand context sensitive cluster analysis services for business intelligence. Moreover, even smaller organizations may be able to avail of on-demand context sensitive cluster analysis services for business intelligence thereby increasing their competitive advantage vis-a-vis larger competitors.

Note that the architecture of system 100 shown in FIG. 1 is exemplary and for descriptive purposes only and various other configurations that would be apparent to one of ordinary skill in the art are possible and envisaged. For example, in some embodiments, on-demand context sensitive cluster analysis services for business intelligence provided by a Data Center 140 may be used by a single customer. In other embodiments, Data Center 140 may be an alternate computing platform offering private cloud-based services and may be internal to a large organization. In general, depending on customer specifications, the architecture of system 100 may be adapted so that one or more services provided by Data Center 140 may be distributed between private infrastructures and public clouds in a manner consistent with embodiments disclosed herein.

In some embodiments, Analytic Client 115 may also include graphics and visualization components and controls. In some embodiments, Analytic Client 115 may comprise reusable visualization components. For example, Analytic Client 115 may comprise Adobe Flash Player to view rich multimedia, streaming video and audio, on a computer web browser or on supported mobile devices. In some embodiments, results returned by Data Center 140 from performing dynamic on-demand context sensitive cluster analysis in business intelligence systems may be displayed in Analytic Client 115 using Flash player.

In some embodiments, requests from Analytic Client 115 may be received by Web Server/Client Interface 135. In some embodiments, Web Server/Client Interface 135 may perform or assist in performing services such as authenticating users, processing log-in and user account related information, route or relay requests from Analytic Clients 115 to function based analytics application engine 150, and/or send responses to Analytic Clients 115. In some embodiments, exemplary Web Server/Client Interface 135 may also interact with Operations Infrastructure 180 to aid in performance monitoring, application logging, configuration management and/or to receive software updates.

In some embodiments, exemplary Function Based Analytics Application Engine 150 may interact with databases or data sources 160 to generate a response or portion of a response related to requests or vQueries received from analytic clients 115. For example, a vQuery received from analytics client 115 may be parsed by function based analytics application engine 150, broken into its constituent sub-queries, which may be used to obtain information from databases or data sources 160 and the results returned from executing the sub-queries may be combined in accordance with the execution path specified in the original vQuery. The combined result may then be returned to analytics client 115. In some embodiments, simple vQueries may be directly executed without breaking the vQuery up into sub-queries. In some embodiments, the sub-queries may be executed in parallel.

Databases, data sets, or data sources 160-1 . . . 160-M may store customer data in a structured or unstructured format. For example, the data may be stored as relational database tables, multi-dimensional tables, multi-dimensional data sets, Excel spreadsheets, and various other formats. In some embodiments, data stored in one or more databases or data sources 160 may be backed up and/or mirrored to increase availability. Users and/or a system administrator may set permissions that limit or prevent user access to data sets within a database/data source 160, and/or to database/data source 160 of other customers.

Shared Services module 170 may provide primary and secondary domain name services ("DNS") and resolve names into IP addresses for the purpose of locating various computer services and devices. Shared Services module 170 may also provide support for implementing Network Time Protocols ("NTP"), which allows clients and servers to synchronize their clocks to a common time reference; and to support various other shared services such as, but not limited to, Simple Mail Transfer Protocol ("SMTP"), which allows the exchange of e-mail messages.

In some embodiments, Operations Infrastructure module 180 may provide support for load balancing, performance monitoring, application logging, system and user configuration management, user and system administration, and/or to receive and disseminate software updates.

Figure 2:
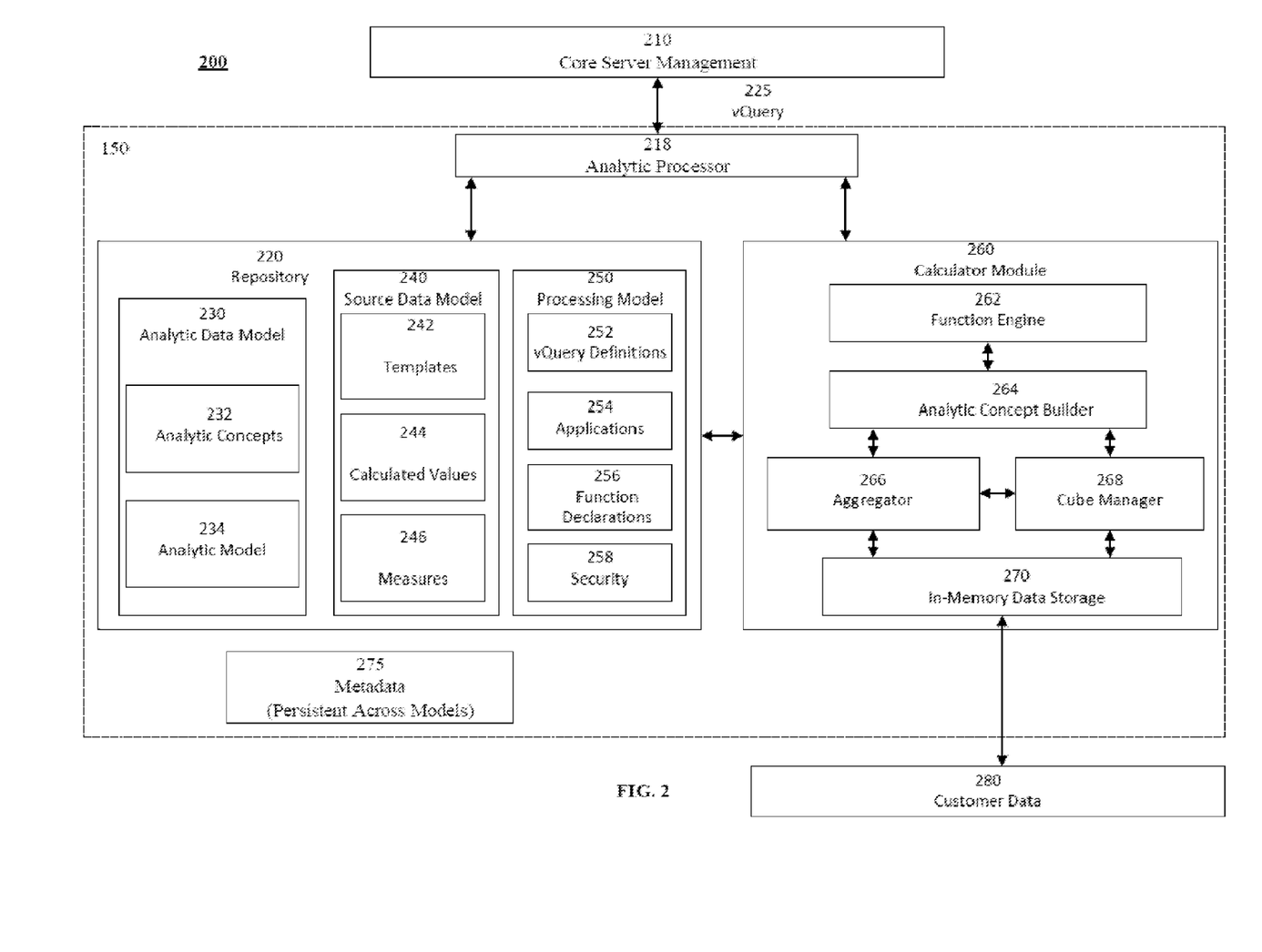
FIG. 2 shows an exemplary server-side architecture of an exemplary system for facilitating dynamic on-demand context sensitive cluster analysis in business intelligence systems.

FIG. 2 shows a block diagram illustrating an exemplary server-side architecture of a system 200 for facilitating dynamic on-demand context sensitive cluster analysis for business intelligence. As shown in FIG. 2, exemplary server architecture 200 may comprise Core Server Management 210, Repository 220, Analytic Processor 218, and the Calculator Module 260. Further, in some embodiments, Analytic Processor 218, Repository 220, Calculator Module 260 and Meta Data 275 may form part of Function Based Analytics Application Engine 150.

Upon receiving a request from the Core Server Management 210, in some embodiments, Analytic Processor 218 may determine if security rules are met using Security Module 258. For example, Security Module 258 may be used to ensure that the user is authorized to execute requested vQuery 225. Next, Analytic Processor 218 may determine if the requested result is available in its cache and if so, returns it to the Analytic Client 115. Otherwise, in some embodiments, Analytic Processor 218 may delegate the execution of the processing functions for vQuery 225, which may be specified in vQuery Definitions module 252, to Function Engine 262 in Calculator Module 260 after ensuring that relevant Customer Data 280 has been loaded into In-Memory Data Storage 270. If relevant Customer Data 280 has not been loaded into In-Memory Data Storage 270, then, in some embodiments, Analytic Processor 218 may invoke special vQueries, termed Data Connector vQueries to load customer data 280 into In-Memory Data Storage 270 prior to invoking Function Engine 262. In some embodiments, the final result obtained as a result of processing vQuery 225 originating from Analytic Client 115 may be cached.

In some embodiments, Analytic Processor 218 may: accept requests, which may take the form of vQuery requests 225, originating from Analytic Client 115; check security policies for the user; look up the definition of vQuery 225 in repository 220; manage the loading of relevant data into In-Memory Data Storage 270; process the requests in part by using one or more modules in server architecture 200—such as Function Engine 262; generate the appropriate data sets; and cache and return results to Analytic Client 115 through core server management layer 210.

In some embodiments, Core Server Management layer 210 may help manage the server environment and provide client interfaces to handle requests from the Analytic Client 115, including any vQueries 225. In some embodiments, Web Server/Client Interface 135 and/or operations infrastructure module 180 may form part of core server management layer 210. For example, core server management layer 210 may facilitate integration with web application containers on analytic clients 115. In some embodiments, the integration with web application containers may be achieved using Jetty and Java API for RESTful Web Services ("JAX-RS") may be used to implement the entry points available to the server's clients. Jetty is a Java-based HTTP server and Java Servlet container.

In addition, in some embodiments, Core Server Management layer 210 may expose one or more web services to clients, such as Analytic Client 115. In some embodiments, the web services that are exposed may include a data service used to retrieve the output of a vQuery, a session service for managing user sessions and user accounts, and an admin service for managing servers. The data service may be used, for example, by Analytic Client 115, to send vQuery requests 225 for processing, to request validation of a client's authentication token, and for routing the request to an appropriate analytic processor 218. In some embodiments, core Server Management layer 210 may also perform or facilitate the performance of user session management tasks, perform JSON wire-format data serialization and deserialization, peer server discovery and management, and event logging.

In some embodiments, Repository 220 may include Analytic Data Model 230, Source Data Model 240, and Processing Model 250. Processing Model 250 may also include vQuery Definitions module 252, and Function Declarations 256 of any available processing functions, metric content definitions, and assets (such as images) available to Analytic Client 115. In some embodiments, Repository 220 may also maintain Metadata 275 and application configuration information. In some embodiments, Repository 220 can be used directly by the Analytic Processor 218 or by the Calculator 260 during the execution of a query. For example, upon receiving a vQuery request, Analytic Processor 218 may look up the requested vQuery definition in Repository 220 to discover the parameter values and an execution path comprising a sequence of processing function calls corresponding to that vQuery.

In some embodiments, Source Data Model 240 may specify a maximal set of fact tables, dimensions and cubes that can be constructed for any customer dataset. Source Data Model 240 may comprise Templates 242 including fact table templates, Calculated Values 244, and Measures 246. Templates 242, Calculated values 244 and Measures 246 may be bound to customer data using Data Connector vQueries.

In general, customer data 280 may be stored in structured or unstructured form. In some embodiments, customer data may comprise fact tables, which may include measures or facts pertaining to a business process. Facts in the fact table may be associated with one or more dimensions, which, in some instances, may be foreign keys that index one or more dimension tables, which describe the facts in the fact table. In the dimension tables, the labels may be described by members. Thus, members may be viewed as categorizing facts in the fact table. For example, in a sales application, a sale (fact) may associated with a key such as a geographical identifier (dimension), and the geographical identifier may be used to determine the location or place of sale (member).

In general, each fact table may comprise several dimensions. For example, a sale may be associated with a date/time dimension, geographical dimension, customer dimension, etc. In addition there may be multiple hierarchy levels of members for a given dimension. In the example, if a "Country" dimension member associated with the geographical dimension refers to countries, then potential choices for places of sale may be one of "Canada," "UK," or the "US." However, a "Province" dimension member (at a lower level in the geographical dimensional hierarchy from "Country") could refer to provinces of Canada, in which case the members might be "British Columbia," "Alberta," etc. Thus, "Country" and "Province" are both members of the geographical dimension but at different levels of hierarchy within the geographical dimension.

In a cube, facts in the fact table may be aggregated and associated across multiple dimensions to form a hypercube (referred to as a "cube"). In general, a cube or multi-dimensional cube be constructed by aggregating facts by both dimension and hierarchy levels within the dimension. For example, a sales number in a cube may be associated with a time period dimension (with members "Q1 2010", "Q2 2010" etc.), a geographic dimension ("Canada", "US", "Japan" etc.), a Product dimension ("Laptop", "Tablet", etc.). Accordingly, the cube may be used to quickly retrieve a result for a query of the type "Sales of Tablets in Canada in Q1 2010." A cube view may be generated by constraining a cube. For example, by limiting the cube to sales in the years 2011 and 2012. Cube views may be seen as the result of performing operations on the cube such as:

(i) "Slicing"—where a rectangular subset of a cube is selected by choosing a single value for one of its dimensions, creating a new cube with one fewer dimension. For example, choosing a specific year, such as 2010 for sales.

(ii) "Dicing"—where a sub-cube is selected by choosing specific values across multiple dimensions. For example, the sales of laptops and tablets in the US and Canada for the years 2010 and 2011.

(iii) "Drill Down/Up"—where the user may view the data at different levels of a dimensional hierarchy from the most summarized (up) to the most detailed (down).

(iv) "Roll-up"—where data is summarized along a dimension. For example, by adding sales across products to obtain total sales.

(v) "Pivot"—where the cube is rotated in space to see an alternate cube face.

In some embodiments, a user may also set filters to specify which members of one or more dimensions may be relevant to a query. Filters may sometimes serve as hidden dimensions of the resulting cell set. For example, in a HCM application, a user may want a list of names of female employees in a current context displayed on a user interface in Analytic Client 115. If the current context is given by the location, British Columbia, then, in the example above, the user may run a query to list all employees, which would be limited based on context to the employees in British Columbia, from which employees who are "male" would be filtered out. Effectively, the user-specified filter, serves to limit the results to female members without directly including a "Gender" dimension in the context.

In some embodiments, Templates 242 may include fact table templates, which specify the calculated values that exist within the table, as well as measures that can be evaluated on sets of facts from the fact table. Calculated Values 244 may comprise information that may be calculated or derived from Customer Data 280. Calculated Values 244 do not directly exist in Customer Data 280. For example, in a HCM application, Employee Tenure changes continuously with the passage of time and therefore cannot be represented as a static value. Accordingly, a function, which uses Employee Hire date and a current or user-specified date as input and outputs Employee Tenure, may be used to represent Employee Tenure.

Measures 246 may take the form of functions that take in a set of facts from the fact table as input, and output one or more values as output. In some embodiments, the input set of facts may arise from a cube view. For example, a measure function may simply count all of the facts in a set of cells and return the count as the result. In some embodiments, Measures 246 may be used by Aggregator 266 to compute results from cube views.

In some embodiments, Analytic Data Model 230 may include Analytic Concepts 232 and Analytic Models 234. Analytic Concepts 232 may comprise functions that use the current application context as input, and output a set of dimension members. For example, in an HCM application, for a current context given by "Low Performers", functions in Analytic Concepts 232 may output a set of performance levels given by {PerfLevel1, PerfLevel2, . . . }. Similarly, for a current context given by "Locations", functions in Analytic Concepts 232 may output a set of Canadian provinces given by {British Columbia, Alberta . . . }. In some embodiments, Analytic Models 234 may take the form of formulas or code, which may be given the output of one or more vQueries, as input, and output results based on the formula or code. In some embodiments, the formulas or code may be specified using "R" or "Excel". For example, we could define an Excel model for "Cost of Turnover" that takes in as input the results of a vQuery returning the number of employees who left an organization in Q1 2012, as well as the average salary of the employees who left, and that outputs the dollar cost associated with replacing these employees.

In some embodiments, Repository 220 may also comprise Processing Model 250. In one implementation, Processing Model 250 may comprise vQuery Definitions 252, Applications 254, Function Declarations 256 and Security module 258. In some embodiments, Function Declarations 256 for processing functions called by Analytic Processor 218 may be held in Processing Model 250 in Repository 220. For example, processing function declarations held in Function Declarations 256 may include, for example, "Analytic Concept Builder", which is responsible for executing multi-dimensional queries, "Remove Attribute", which removes a column from a result set, or "UnionOverPeriod", which stitches together the results from a number of vQueries executed at different points in time in order to construct the result set needed to render a line chart. In general, processing functions may be one of the following types: (i) Data Transformation/Aggregate Functions—such as ExcelFormula( ), ExecuteOverYear( ), ExtractCauses( ), etc., are responsible for calculating result sets and transforming and transforming the results of other functions into the forms required for display purposes (ii) Fetch Functions—for fetching data from various sources such as SqlDatabaseFetch( ), WebServiceFetch( ), XlsFetch( ), etc.; (iii) Exporting Functions for exporting results in a variety of data formats such as XlsExport( ), SqlExport( ), etc.; and (iv) Custom processing functions, which may be user-defined.

In some embodiments, Processing Model 250 may also comprise vQuery Definitions 252. A vQuery may take the form of a parameterized function that returns a result set. In general, vQueries can be collections of Analytic Data Models 230 and/or Source Data Models 240, processing functions, and may be composed of sub-vQueries. In some instances, a vQuery may return a result, which may take the form of: a multi-dimensional cell set, source records from a database or webservice, or any other multi-dimensional data or record set. In some embodiments, vQueries may be classified as Data Connector vQueries and Analytic vQueries. Data Connector vQueries may load data from an external source such as a Database, Web Service, Excel spreadsheet, etc. and may provide that data to components or modules in Function Based Analytics Application Engine 150. For example, Data Connector vQueries may be used to load customer data at initialization time into the In-Memory Data Storage 270. Thus, Data Connector vQueries may execute even if customer data has not been loaded into In-Memory Data Storage 270. In other instances, Data Connector vQueries may be used to directly provide external data to Analytic Client 115. For example, external benchmarking data for comparison purposes such as an industry's average compensation, or the nation's current unemployment rate may be provided to Analytic Client 115.

In some embodiments, Analytic vQueries may be used to calculate the result sets that are returned to the client by executing a set of processing functions and/or other vQueries. For example, in an HCM application, the cost of employee turnover may return a scalar number as a result. The "Cost of Turnover" Analytic Model may use the result from a "Turnover" vQuery as its input. Turnover vQuery, in turn, may use "Organization Concept" and "DateRange Concept" functions in Analytic Concepts 232 as inputs. Organization Concept may use a specific department or organizational unit as input, or may use application context to determine the organizational unit. Thus, the Cost of Turnover Business Concept may use as input the result of a "Turnover Business Concept" function in Analytic Concepts 232, which, in turn, may use Organization Concept with two parameters—the name of the specific organizational unit and the date range. Accordingly, the chain of evaluation can be expressed, for example, by:

Cost of Turnover (Turnover (Organization ("Engineering", "2011-2012")))=$373,000

The example above illustrates how higher-order "Business Concepts," such as Cost of Turnover, may be evaluated through functional decomposition. In the example above, Organization and Turnover may be implemented as vQueries, and the organizational unit "Engineering" and date range "2011-2012" are parameters. In some embodiments, higher-order analytic concepts may be created by binding the concepts to a series of functions resulting in complex vQueries. Metrics may be viewed as analytic business concepts that are capable of being calculated by one or more vQueries. In some embodiments, a metric may correspond to a specific vQuery. For example, in an HCM application, a metric to determine the "Direct Compensation per Full Time Employee" may be evaluated by invoking an associated vQuery called "directCompensationPerFTE".

In some embodiments, Calculator Module 260 may execute Processing Functions and calculate the vQuery results originating from Analytic Client 115. As shown in FIG. 2, Calculator Module 260 may comprise Function Engine 262, Analytic Concept Builder 264, Aggregator 266, Cube Manager 268 and In-Memory Data Storage 270. In some embodiments, In-Memory Data Storage 270 may comprise a proprietary In-Memory Column Based Database.

Function Engine 262 may be invoked by Analytic Processor 218. In some embodiments, Function Engine 262 may split or decompose vQueries to sub-vQueries. In some embodiments, some of the sub-vQueries may be executed in parallel. For example, when a vQuery generates a set of results and each result is based on a distinct set of dimension members, then the vQuery may be decomposed into parallel-executing sub-vQueries, where each sub-vQuery operates on one of the distinct sets of the dimension members. For example, in a sales application, for vQuery to determine sales by quarter over some date range, in one implementation, the vQuery may be broken up into sub-vQueries where each sub-vQuery determines sales for one quarter in the date range. A similar approach may be used to decompose vQueries into parallel-executing sub-vQueries to determine sales by geography, sales by organizational unit etc.

In some embodiments, parallelizable vQueries received by Function Engine 262 may be split into sub-vQueries. Function Engine 262 may then call Analytic Processor 218 with the new set of sub-vQueries to be executed in parallel. In some embodiments, a Cube View may be constructed for each sub-vQuery appropriately constrained by dimension member values and a result obtained for each sub-vQuery. In some embodiments, Analytic Processor 218 may call (i) a "UnionOverPeriod" processing function, which may perform a set union operation and place all the results into a single data set; and (ii) a "Tag" processing function, which appends appropriate dimension member values (such as the appropriate value of the sales quarter "Q1 2010", "Q2 2010" etc.) to each result. The result set may then be returned to Analytic Client 115 through Core Server Management layer 210.

In some embodiments, Function Engine 262 may load and execute processing function plugins used by Analytic Processor 218. Processing function plug-ins provide an extension to the capabilities of Function Engine 262. In one embodiment, Function Engine 262 may use a predefined interface to discover, load and execute a function. In some embodiments, in addition to a rich set of predefined functions, the predefined interface may be used to permit third party plug-ins thereby extending the capability of Function Engine 262. For example, any new user defined formulas, mathematical models, business rules, data transformations, export formats, or data connectivities can be supported by developing a processing function, implementing the well defined interface (for example by using Java classes), and making the function available to Function Engine 262. For example, third party function libraries such as the SAS XLS engine and R engine may be made available to Function Engine 262. A processing function may be any function called by Analytic Processor 218. In some embodiments, processing functions may be able to recursively call back into Analytic Processor 218 to retrieve relevant result-sets; and/or manipulate result sets themselves; and/or call into Calculator Module 260 to build a result set from cube views and customer provided data.

In some embodiments, Analytic Concept Builder 264 may be implemented as a processing function and may be called by Analytic Processor 218 to execute Analytic Concepts 232 by communicating with Cube Manager 268 to obtain relevant cube views from Cube Manager 268 and calling Aggregator 266 to compute results. For example, if a 'Products' organization includes organizational units 'Manufacturing' and 'R&D', and exemplary Analytic Concept 232 such as "All sub-organizations within a 'Products' organization" was a part of a vQuery, then, upon evaluation of the analytic concept by the Analytic Concept Builder 264, relevant dimension members "Manufacturing" and "R&D", which are hierarchically below 'Products' may be retrieved.

In some embodiments, Customer Data 280 may be split into Shards. A Shard may be viewed as a subset of the Customer Data 280 including that subset of data matching a specific filter. For example, the data for one quarter of a year, or for some other specified time period. When the filter is applied on a quarter-by-quarter basis to entire Customer Data 280, the set of individual shards constitute the entire customer data-set. In some embodiments, shards may be created from Customer Data 280 and may be held on different physical servers. In some instances, holding shards on different physical servers may facilitate load balancing and improve fault tolerance and data availability.

When a vQuery spans multiple shards, Analytic Concept Builder 264 may split the vQuery request into smaller sub-vQueries called "chunks". Further, in some embodiments, Analytic Concept Builder 264 may call Analytic Processor 218 with "chunk requests". Analytic Processor 218 may use information pertaining to the physical distribution of data to send the sub-vQuery chunk requests to appropriate servers. The results obtained from executing the various sub-vQuery chunks may be used by Analytic Processor 218 to obtain a final result, which may be returned to Analytic Client 115 through Core Server Management layer 210.

In some embodiments, the chunk sub-vQuery requests may be further split into finer granularity sub-sub-vQuery requests. For example, each physical server may have several multi-threading processors or processor cores and a processor (or processor core) may be assigned one or more sub-sub-vQuery requests. The finer granularity requests may then be executed in parallel. For example, when a vQuery operates on data over a year whereas the data shards contain data for one quarter, Analytic Concept Builder 264 may split the vQuery into chunks, where each sub-vQuery chunk operates on data for a distinct quarter. Analytic Concept Builder 264 may then send the sub-VQuery chunks to Analytic Processor 218, which may relay them to appropriate servers for processing. In some embodiments, the sub-vQuery chunks may be further split by Analytic Processor 218, for example, into sub-sub-vQueries that operate on data for one month within each quarter—so the original vQuery operating on data over a year may be broken up into twelve parallel-executing sub-sub-vQueries. In some embodiments, each of the twelve parallel-executing sub-sub-vQueries may be executed on a distinct processor core. The results of the twelve parallel-executing sub-sub-vQueries may be combined by Analytic Processor 218 to obtain a final result.

In some embodiments, Cube Manager 268 may receive requests for cube views from Analytic Concept Builder 264. In some embodiments, Cube Manager 268 may cache cube views it constructs and construct new relevant cube views when the views do not exist in the cube view cache. If a requested cube view is in the cache, Cube Manager 268 may retrieve and return the cube view. In the event that requested cube view does not exist in the cache, then, Cube Manager 268 may construct the cube view. In some embodiments, cube views may be transient—so that they are built on-the-fly for quick calculations and then destroyed when no longer used. Various optimization algorithms may be used to maintain and/or replace cube views in the cache, such as Least Recently Used (LRU), Least Frequently Used (LFU), Random Replacement, Most Recently Used (MRU) etc. In some embodiments, cube views may be removed from the cache after some pre-defined time period.

In some embodiments, Analytic Concept Builder 264 may also call Aggregator 266 and pass cube view(s), filters, and any members and dimensions specified by the client, and/or generated by Analytic Concept Builder 264 so that Aggregator 266 has all the resources necessary to compute results. Aggregator 266 may determine results from cube views and return results to the Analytic Concept Builder 264. In some embodiments, Aggregator 266 may execute a multi-dimensional query or a drillthrough query on relevant cells in the cube view(s) to obtain results.

Multi-dimensional queries executed by Aggregator 266 to calculate results from cube views identify the data source, relevant cube members and dimensions, and relevant cube slices. Accordingly, the multi-dimensional queries executed by Aggregator 266 may identify members in specific dimensions For example, the multi-dimensional query may request total sales over members of: a time period dimension such as "Q1 2010 and Q2 2010"; a geographic dimension such as "US and Canada"; and a Product dimension "Laptops and Tablets". A cube constructed by Cube Manager 268 may then be used to quickly retrieve a result for the multi-dimensional query "Total Sales of Laptops and Tablets in US and Canada in Q1 2010 and Q2 2010". In some embodiments, Aggregator 266 may also aggregate or summarize values from cells to obtain results. For example, Aggregator 266 may perform various aggregate mathematical or statistical operations, which may be defined in Measures module 246, on values. The mathematical operations may include counts, sum, and/or averages of values.

For drillthrough queries, Aggregator 266 may return actual fact data. In some instances, for a drillthrough query, a user may want fact data to be returned, such as list of all of the employees in the current context (e.g. location—"Canada") related to a metric—which may be "absent days in March." Accordingly, Aggregator 266 may identify relevant dimension members, apply appropriate filters, and return fact results.

In some embodiments, In-Memory Data Storage 270 may hold an In-Memory Column Based Database, which may comprise customer data 280. In some embodiments, Customer Data 280 may be loaded by Data Connector vQueries called by the Analytic Processor 218. In some embodiments, Cube Manager may use In-Memory Column Based database to build cube views. Cube views permit quick responses to multi-dimensional queries. For example, if a vQuery requests data such as "Female Analysts in the Products organization in Canada", the cube view would use the "female" member of the Gender dimension, the "analyst" member of the Role dimension, the "Products" member of the Organization dimension, and the "Canada" member of the Locations dimension. The resulting cells in the cube view would contain relevant facts to calculate the result.

Figure 3:
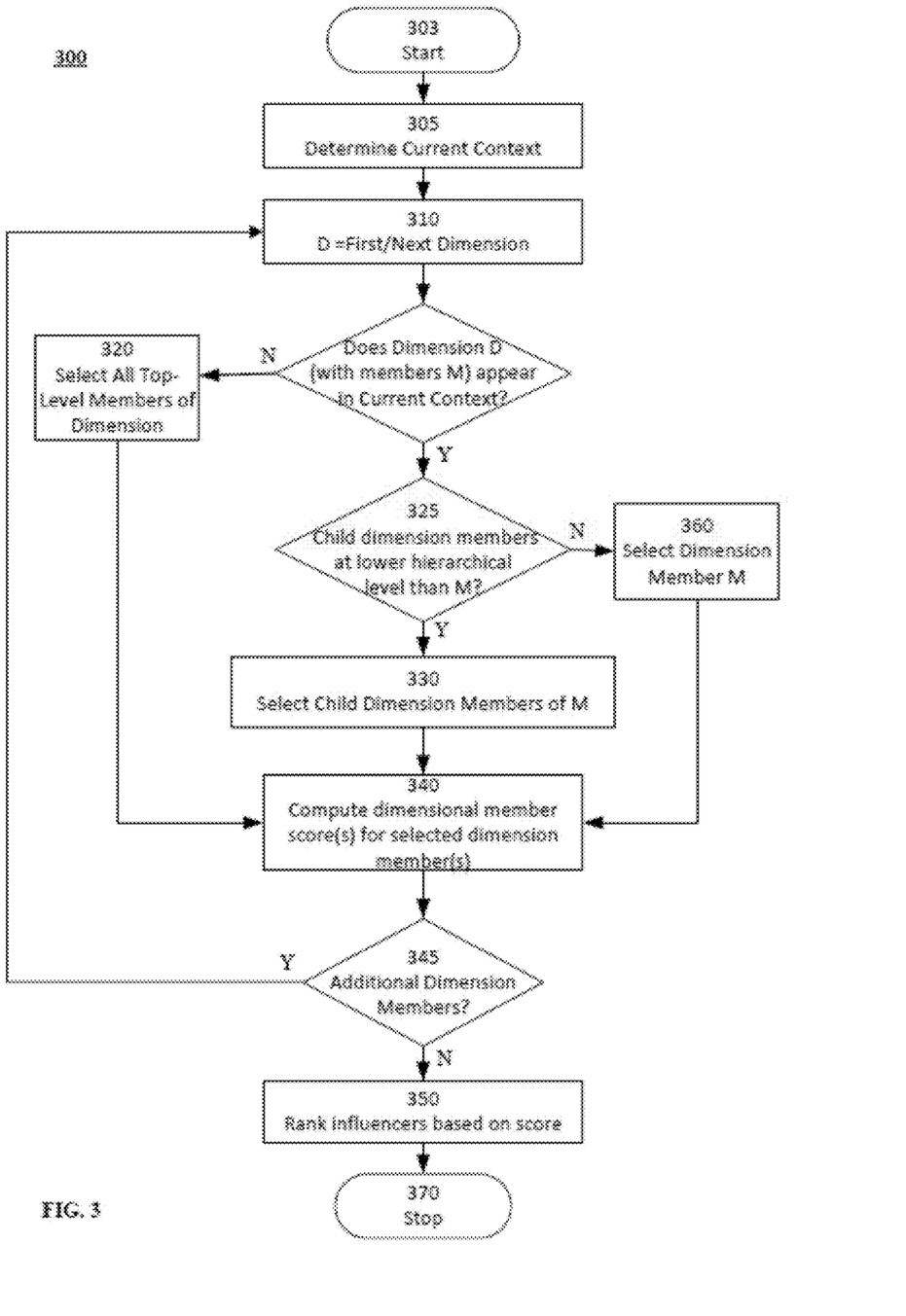
FIG. 3 shows a flowchart illustrating an exemplary method for performing dynamic on-demand context sensitive cluster analysis.

FIG. 3 shows a flowchart illustrating an exemplary method 300 for performing dynamic on-demand context sensitive cluster analysis. In some embodiments, method 300 may be performed by one or more modules on exemplary system 200. In some embodiments, method 300 may be performed in response to one or more vQueries initiated using Analytic Client 115.

In some embodiments, the algorithm may start in step 303, where various initialization and housekeeping operations may be performed. In traditional BI systems, while users may perform slicing, dicing, and other operations on the data, the user's ability to run application specific queries on demand to derive information about underlying relationships and/or trends in customer data is limited. Accordingly, in some embodiments, pre-defined application specific queries may be provided to the user to facilitate decision-making and to uncover latent relationships and trends. In some embodiments, these predefined application specific queries may serve as an entry point for facilitating on-demand context sensitive cluster analysis. In some embodiments, method 300 may start in step 303, when a user invokes one or more pre-defined application specific queries. In some embodiments, the pre-defined application specific queries may take the form of one or more vQueries.

Next, in step 305, the current context may be determined In some embodiments, the current context may be indicated by the user, or determined automatically by current hierarchy level(s) of member(s) of one or more dimensions based on the data set being viewed in a user's browser. For example, the current context may be determined automatically by a browser or other application through which the user may view business intelligence information. The term "context sensitive" refers to the use of the current context for analysis, query generation, and other business intelligence operations. The current context may be seen as specifying a cube view or the current fact population being analyzed.

In general, a set of facts may be analyzed by grouping them based on dimension members, so that each dimension member may correspond to some subset of the fact set. In some embodiments, for a given metric, one or more underlying trends or relationships between the metric and dimension members may be uncovered by identifying and/or ranking dimension members by the extent of to which they positively or negatively influence the metric. Positive influencers of a metric may be termed "contributors", and negative influencers may be termed as "reducers". For example, in an HCM application, a user may be interested in determining influencers of a metric "Direct Compensation per Full Time Employee." Accordingly, the user may be provided with a pre-defined application specific query, which may take the form of a vQuery to evaluate influencers of the metric "Direct Compensation per Full Time Employee". The predefined application specific query to evaluate influencers of the metric "Direct Compensation per Full Time Employee," may start by invoking another vQuery called "directCompensationPerFTE" to calculate the metric Direct Compensation per Full Time Employee based on the current context.

Accordingly, in step 310, a first or next dimension D may be considered. If current dimension D appears in the current context ("Y" in step 315) then, in step 325, let M designate the member of D appearing in the current context. Any child dimension members M at a lower hierarchical level may be considered. If there are child dimension members of M at the lower hierarchical level ("Y" in step 325), then, in step 330, the child dimension members of M may be selected. If there are no child dimension members of M at the lower hierarchical level ("N" in step 325), then, in step 330, then, the current dimension member M may be selected in step 360.

On the other hand, if current dimension D does not appear in the current context ("N" in step 315) then, in step 320, all top level members of the current dimension D are selected in step 320.

In step 340, dimensional score(s) may be computed for the selected dimensional member(s). In some embodiments, a dimensional score may represent one measure of the influence of the selected dimension member(s) on the metric. The sign of the score may indicate whether the dimension member has a positive or negative influence on the metric. For example, a higher absolute score may indicate that the dimension member has a greater influence on a metric. Further, a positive score may indicate that the dimension member is a contributor, while a negative score may indicate that the dimension member is a reducer.

In general, a dimension member may be considered as an influencer of a metric if the dimension member skews the value of the metric over the population being considered. For example, if 200 employees in Canada have quit in some time period out of a total of 1000 employees in Canada (i.e. a 20% employee turnover), whereas only 250 employees have quit worldwide out of a total of 5000 employees (i.e. a 5% employee turnover), then dimension member "Canada" may be considered a large contributor to the overall employee turnover rate. In some embodiments, the dimensional member score computed in step 340 may offer a quantitative assessment of the influence of the selected dimensional member on the metric over the population being considered.

In some embodiments, a quantitative score to measure the degree of influence of a dimension member over a metric may be computed as:

$$\text{Score}=(GM-OM)*(GP/OP), \text{ if } OP>0; \text{ Score}=0, \text{ otherwise} \quad \text{equation (1)}$$

where, GM is the Group Metric value and is defined as the value of the metric over the selected dimension member; OM is the Overall Metric value and is defined as the value of the metric over the entire population being considered; GP is the Group Population count defined as the size of the population or number of individual data points or facts in the selected dimension member; and OP is the Overall Population count defined as the size of the overall population.

In equation (1), Score factors both the deviation of the dimension member's metric value from the overall value as well as a relative significance of the influencer by weighting the deviation by the population size of the dimension member relative to the overall population. Note the equation (1) merely provide one quantitative measure of the influence of the selected dimension member. In general, various other measures of score may be used. For example, in one embodiment, Score may be computed as $$\text{Score}=(GM\ OM)*GP, \text{ if } OP>0; \text{ Score } 0, \text{ otherwise} \quad \text{equation (2)}$$

Equation (2) make use of the fact that, in Equation (1), OP, the overall population count being considered, is constant and does not vary with dimension member. Therefore, ranking dimension members for influence based on equations (1) and (2) will yield identical results. As a further example, in another embodiment, in instances where the metric is a "count" of some sort (i.e. a counting type metric), Score may be computed as $$\text{Score}=(GM/OM)-(GP/OP) \quad \text{equation (3)}$$

In equation (3), Score is measured as the difference between the actual contribution of an influencer (GM/OM) to an expected contribution of the influencer (GP/OP).

Next, in step 345, algorithm 300 may consider additional dimensions, if any. If there are additional dimensions ("Y" in step 345), the algorithm returns to step 310 to begin another iteration with the next dimension. If there are no more dimensions to be considered ("N" in step 345) then, the algorithm proceeds to step 350.

In step 350, the dimension members considered are ranked based on the scores computed in step 340. In one embodiment, dimension members with positive score values and dimension members with negative score values may be separated. Positive scores may be sorted in decreasing order of score value to rank contributor dimension members in order of influence on the metric. Similarly, negative score values may be sorted in decreasing order of score magnitude to rank reducer dimension members in order of influence on the score metric. In some embodiments, the algorithm may output the top "N" contributors and reducers. The method 300 ends at step 370.

In some embodiments, instead of including the top "N" contributors and reducers, a rank diversification algorithm may introduce lower ranked members from different dimensions, while removing higher ranked dimension members. The rank diversification algorithm may operate to increase the number of distinct populations included in the output results.

For example, suppose that the top drivers of the turnover rate metric for a company (with overall turnover rate of 1%) are "Location=Canada" (turnover=25, population size=250, turnover rate=10%) and "Pay Level=F" (turnover=18, population size=200, rate=9%), and within this organization almost all employees assigned to pay level F are located in Canada, so that there are 190 employees in Canada who are assigned to pay level F. Both of these characteristics are strong influencers of the metric value, but we can see that "Pay Level=F" is subsumed by "Location=Canada", and as this latter characteristic has very high population overlap with the former. Thus, we may want to diversify our results by not including "Pay Level=F" in our top-N results, and thus making room in the top-N for another, more different, characteristic/influencer. In situations, where the overlap in populations between a pair of dimension members of different ranks exceeds some threshold, diversification may operate to remove the lower ranked dimension member of the pair from the output results, while adding a third lower ranked member to increase the number of distinct populations included in the output results. In general, diversification may operate to remove one or more lower ranked dimension members from the output results when the population overlap between the dimension members exceeds some threshold.

Figure 4:
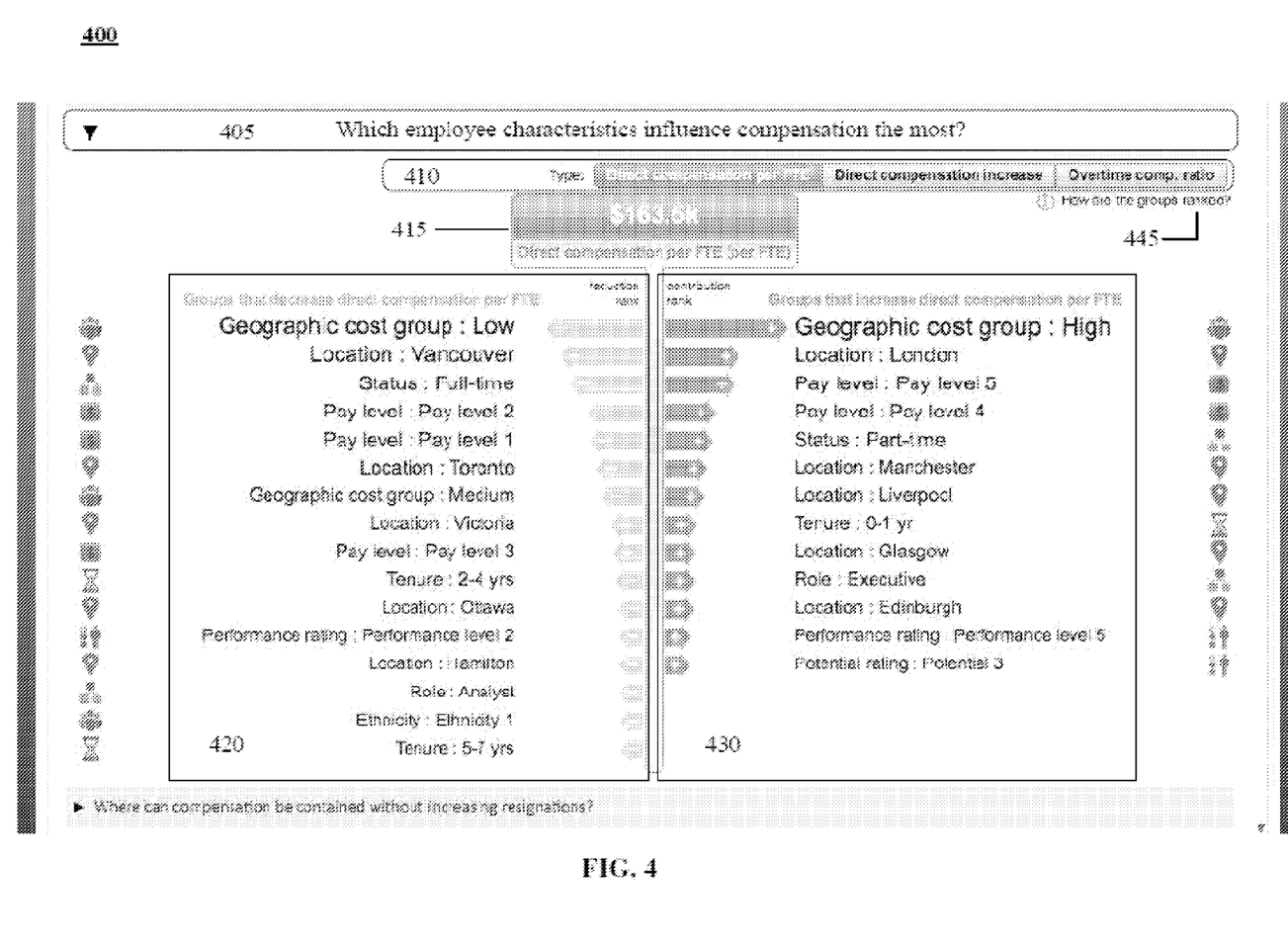
FIG. 4 shows an exemplary user interface screen for performing dynamic on-demand context sensitive cluster analysis.

FIG. 4 shows an exemplary user interface screen 400 for performing dynamic on-demand context sensitive cluster analysis. In some embodiments, user interface ("UI") screen 400 may be displayed to a user by Analytic Client 115. In some embodiments, users may select and run one or more context sensitive queries on demand to derive information about underlying relationships and/or trends in customer data 280, for example, by using drop down menu 405. In some embodiments, on-demand context sensitive queries run by the user may take the form of vQueries and may be sent by Analytic Client 115 for processing by exemplary system 200.

As shown in FIG. 4, UI screen 400 displays information pertaining to an HCM application to the user. Note that exemplary UI screen 400 showing information pertaining to an HCM application is used in this document for explanatory and illustrative purposes only. In general, the techniques disclosed herein may be used in a variety of other applications as would be apparent to one of ordinary skill in the art. UI screens may be user-configurable and a variety of techniques may be used to display the data and interrelationships in a clear and intuitive manner.

In some embodiments, UI 400 may provide a variety of predefined application specific queries based on the current context to analyze one or more metrics by identifying, ranking, and/or otherwise categorizing dimension members by the extent of to which they positively or negatively influence the metric(s). For example, as shown in FIG. 4, the user may use drop-down menu 405 to select a query in order to determine which employee characteristics have the greatest positive or negative influence on compensation in the current context.

As shown in FIG. 4, UI 400 also permits the user to select one or more metrics that apply to the current context. For example, tab selection 410 permits the user to select Direct Compensation per Full Time Employee ("FTE"), Direct Compensation Increase, and Overtime Compensation Ratio as a metric of interest.

Overall metric value 415 is presented to the user to show the user the average direct compensation per FTE for the current context.

As shown in FIG. 4, UI 400 also displays the results 420 and 430 of running the pre-defined dynamic on-demand context sensitive cluster analysis—relating to employee characteristics that influence compensations—selected from drop down menu 405. In some embodiments, each listed dimension member that influences the metric being considered may be shown with a unique icon.

As shown in FIG. 4, histogram 420 displays dimension members that are reducers (and negatively impact) the metric direct compensation per FTE in decreasing order of rank. Conversely, histogram 430 display dimension members that are contributors (and positively impact) the metric direct compensation per FTE in decreasing order of rank. For example, histogram 420 shows that locations classified as low cost geographic groups (Geographic cost group: Low) have the greatest impact in reducing direct compensation per employee and that Vancouver is the location with greatest negative impact. Conversely, histogram 430 shows that locations classified as high cost geographic groups (Geographic cost group: High) have the greatest impact in increasing direct compensation per employee and that London is the location with greatest positive impact. In addition, histogram 420 lists full time status as a factor influencing employee compensation negatively, while histogram 430 list pay level 5 as a factor influencing employee compensation positively. In some embodiments, UI 400 may include links 445 that explain the ranking methodology. In some embodiments, links 445 may also allow users to alter the ranking methodology by selecting an alternate scoring mechanism, or by applying rank diversification algorithms.

It should be noted that the examples provided above are for explanatory purposes only and many other variations of disclosed embodiments are possible and envisaged. For example, a variety of methods and/or models may be used to score and rank dimension members; create predefined dynamic and on-demand context sensitive cluster analysis routines. In addition, systems disclosed for performing on-demand context sensitive cluster analysis may be deployed on public and/or private clouds accessible over the Internet through a browser or other clients. Further, the methods disclosed may be used with various proprietary systems. In some embodiments, the methods and techniques disclosed may be embodied as program code in computer-readable media. Computer-readable media may include magnetic, solid state and optical media, including but not limited to hard drives, solid state drives, flash drives, memory cards, optical disks, etc. In some embodiments, the user interfaces disclosed may be extended to enable more detailed control over program parameters and enhanced visualization of content.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A processor-implemented method comprising:
   selecting a subset of a plurality of dimension members of a multi-dimensional data set;
   computing a plurality of dimensional scores for the dimension members in the selected subset, wherein each dimensional score is associated with a particular dimension member in the subset and is a measure of a dimensional influence of the associated dimension member on a metric associated with the multi-dimensional data set, wherein a dimension member with greater dimensional influence affects a value of the metric over a population more than a dimension member with less dimensional influence; and
   ranking the dimension members in the selected subset based on the dimensional scores.

2. The processor-implemented method of claim 1, wherein the method is performed at:
   a compute cloud,
   a server, or
   a computing device.

3. The processor-implemented method of claim 1, wherein the selected subset of the plurality of dimension members is determined based on user input.

4. The processor-implemented method of claim 1, further comprising storing a multi-dimensional cube that represents the multi-dimensional data set.

5. The processor-implemented method of claim 4, further comprising dynamically generating the multi-dimensional cube in response to determining that the multi-dimensional cube is not stored in a memory.

6. The processor-implemented method of claim 1, wherein the metric is associated with at least one of direct compensation, overtime compensation, or employee resignation.

7. The processor-implemented method of claim 1, wherein the plurality of dimension members includes at least one of a geographic cost group, a geographic location, an employment status, a pay level, a tenure, a performance level, or an employee role.

8. The processor-implemented method of claim 1, further comprising displaying a subset of the ranked dimensional members in order of rank.

9. The processor-implemented method of claim 1, wherein the computing of the plurality of dimensional scores for the dimension members in the selected subset is performed in parallel.

10. A system comprising:
a storage device storing a multi-dimensional database, wherein the multi-dimensional database comprises a plurality of dimension members of a multi-dimensional data set; and
a computing device configured to perform operations comprising:
selecting a subset of the plurality of dimension members;
computing a plurality of dimensional scores for the dimension members in the selected subset, wherein each dimensional score is associated with a particular dimension member in the subset and is a measure of a dimensional influence of the associated dimension member on a metric associated with the multi-dimensional data set, wherein a dimension member with greater dimensional influence affects a value of the metric over a population more than a dimension member with less dimensional influence; and
ranking the dimension members in the selected subset based on the dimensional scores.

11. The system of claim 10, wherein the computing device is associated with a cloud or a server farm.

12. The system of claim 10, wherein the operations further comprise sending a subset of the ranked dimensional members to a display device coupled to the computing device.

13. The system of claim 12, wherein the display device displays the subset of ranked dimensional members in order of rank and wherein the computing device comprises:
a smart phone,
a handheld computing device,
a tablet computer,
a notebook computer, or
a desktop computer.

14. The system of claim 10, wherein the selecting, the computing, and the ranking are performed during execution of a workflow comprising a collection of application-specific functions related to specific business applications.

15. A non-transitory computer-readable medium comprising instructions that, when executed, cause a processor to perform operations comprising:
generating a user interface based on dimensional scores for dimension members in a selected subset of dimension members of a multi-dimensional data set, wherein each dimensional score is associated with a particular dimension member in the subset and is a measure of a dimensional influence of the associated dimension member on a metric associated with the multi-dimensional data set, wherein a dimension member with greater dimensional influence affects a value of the metric over a population more than a dimension member with less dimensional influence; and
sending the user interface to a display device.

16. The non-transitory computer-readable medium of claim 15, wherein the operations further comprise selecting the subset of dimension members and computing the dimensional scores.

17. The non-transitory computer-readable medium of claim 15, wherein the user interface includes a first portion that indicates dimension members that negatively impact the value of the metric and a second portion that indicates dimension members that positively impact the value of the metric.

18. The non-transitory computer-readable medium of claim 17, wherein dimension members in the first portion are listed in decreasing order of dimensional score and wherein dimension members in the second portion are listed in decreasing order of dimensional score.

19. The non-transitory computer-readable medium of claim 15, wherein the user interface is configured to receive user input selecting the metric, and wherein the user interface indicates an overall metric value associated with an application context.

* * * * *